(12) United States Patent
Yang

(10) Patent No.: US 11,377,017 B1
(45) Date of Patent: Jul. 5, 2022

(54) REAR HATCH CAMPER

(71) Applicant: Kevin Yang, Rolling Hills Estate, CA (US)

(72) Inventor: Kevin Yang, Rolling Hills Estate, CA (US)

( * ) Notice: Subject to any disclaimer, the term of this patent is extended or adjusted under 35 U.S.C. 154(b) by 0 days.

(21) Appl. No.: 17/197,890

(22) Filed: Mar. 10, 2021

(51) Int. Cl.
*B60P 3/39* (2006.01)

(52) U.S. Cl.
CPC ..................................... *B60P 3/39* (2013.01)

(58) Field of Classification Search
CPC ............... B60P 3/39; B60P 3/34; E04H 15/06
USPC ............ 296/174, 164, 165, 161, 26.11, 159; 108/44
See application file for complete search history.

(56) References Cited

U.S. PATENT DOCUMENTS

| 5,820,189 | A * | 10/1998 | Tew | B60P 3/341 |
| | | | | 296/26.11 |
| 9,834,951 | B1 * | 12/2017 | Townley | B60J 5/101 |
| 10,793,043 | B2 * | 10/2020 | Tovani | B60N 3/001 |
| 2009/0179455 | A1 * | 7/2009 | Ogden | E04H 15/06 |
| | | | | 135/88.14 |

* cited by examiner

*Primary Examiner* — Joseph D. Pape
(74) *Attorney, Agent, or Firm* — Clement Cheng

(57) ABSTRACT

A rear hatch camper is designed to secure to a rear hatch of a vehicle. The rear hatch camper has an inside rail with an inside rail abutment face. The inside rail has a latch hook configured to connect to a cargo loop anchor on a vehicle. A rail adapter is elongated and flat with a rail adapter abutment face that abuts the inside rail abutment face and is secured to the inside rail. A table has a table front edge that engages the rail adapter at an adapter support. The table has a table folding leg mounted on a table folding hinge. The table folding hinge is mounted to an underside of the table.

13 Claims, 4 Drawing Sheets

REAR HATCH CAMPER

FIELD OF THE INVENTION

The present invention is in the field of rear hatch campers.

DISCUSSION OF RELATED ART

A variety of different vehicle tents allow camping from a vehicle.

SUMMARY OF THE INVENTION

It is an object of the present invention to secure a raised table platform to a rear hatchback of a vehicle to provide a flat working or sleeping for a rear hatch camper.

A rear hatch camper is designed to secure to a rear hatch area of a vehicle. The rear hatch camper has an inside rail with an inside rail abutment face. The inside rail has a latch hook configured to connect to a cargo loop anchor on a vehicle. A rail adapter is elongated and flat with a rail adapter abutment face that abuts the inside rail abutment face and is secured to the inside rail. A table has a table front edge that engages the rail adapter at an adapter support. The table has a table folding leg mounted on a table folding hinge. The table folding hinge is mounted to an underside of the table.

The inside rail abutment face abuts a vehicle threshold at a vehicle threshold front face. A curtain is mounted on a curtain rod, and the curtain rod is configured to be bendable at a curtain rod bend. A rear hatch magnet connects to a rear hatch of the vehicle and secures the curtain rod to the rear hatch.

The inside rail is longer than the hatch opening, such that it lodges on an inside surface of the vehicle hatch opening and does not pull out of the vehicle. The rail adapter has an adapter right bevel and an adapter left bevel. The adapter support can be formed as an adapter right support, and an adapter left support. An adapter right anchor and an adapter left anchor can connect to a right cable, and the adapter left anchor can connect to a left cable.

A curtain has a curtain rod secured at curtain clips. The curtain attaches to the rear hatch of the vehicle at an attachment magnet. The attachment magnet secures the curtain rod to a rear hatch of the vehicle.

The following callout list of elements can be a useful guide in referencing the element numbers of the drawings.
20 Inside Rail
21 Inside Rail Abutment Face
22 Latch Hook
23 Left Rail Tip
24 Latch Hook Mount
25 Latch Handle Hinge
26 Latch Handle
27 Hook Arm
28 Hook Tip
29 Hook
30 Cargo Loop
31 Cargo Loop Mount
32 Cargo Loop Hinge
33 Cargo Loop Opening
34 Cargo Loop
35 Right Cable
36 Left Cable
40 Rail Adapter
41 Rail Adapter Abutment Face
42 Adapter Right Bevel
43 Adapter Left Bevel
44 Adapter Right Face
45 Adapter Left Face
46 Adapter Right Anchor
47 Adapter Left Anchor
48 Adapter Right Support
49 Adapter Left Support
40 Rail Adapter
50 Table
51 Table Top
52 Table Front Edge
53 Table Left Edge
54 Table Right Edge
55 Table Rear Edge
56 Table Folding Leg
57 Table Folding Hinge
58 Folding Leg Support
59 Folding Leg Footing
60 Curtain
61 Curtain Rod
62 Curtain Clip
63 Magnet Attachment
64 Rear Hatch Magnet
65 Curtain Inside Edge
66 Curtain Inside Edge Magnet
67 Curtain Rod Bend
68 Curtain Weighted Lower
70 Vehicle Trunk
71 Trunk Bed
72 Hatch Opening Threshold
73 Hatch Opening
74 Rear Bumper
75 Rear Bumper Upper Surface
76 Threshold Rear Face
77 Threshold Upper Surface
78 Threshold Front Face
79 Right Tail Light

DETAILED DESCRIPTION OF THE PREFERRED EMBODIMENT

Figure 1:
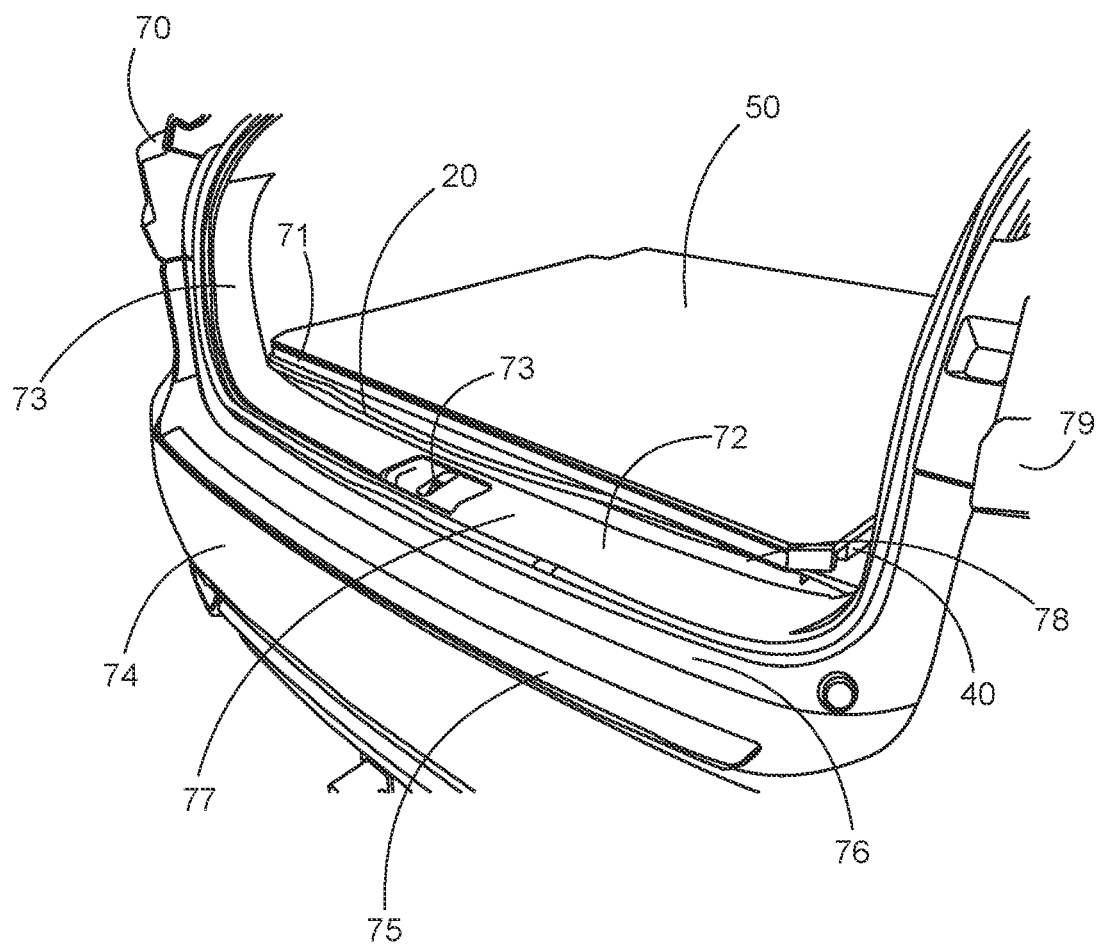
FIG. 1 is a stowed view of the present invention.

As seen in FIG. 1, an inside rail 20 and rail adapter 40 can be placed under a table 50 in a vehicle trunk 70 on a trunk bed 71. When placed in the vehicle trunk 70 the hatch opening threshold 72 by the hatch opening 73 retains the inside rail 20, rail adapter 40, and the table 50.

The vehicle has a rear bumper 74 with a rear bumper upper surface 75. The hatch opening threshold 72 has a threshold front face 78 retaining the stowed rear hatch camper. The hatch opening threshold 72 also has a threshold rear face 76 opposing the threshold front face 78. The hatch opening threshold 72 has a threshold upper surface 77. The hatch opening 73 is positioned between the right tail light 79, and the left tail light.

Figure 2:
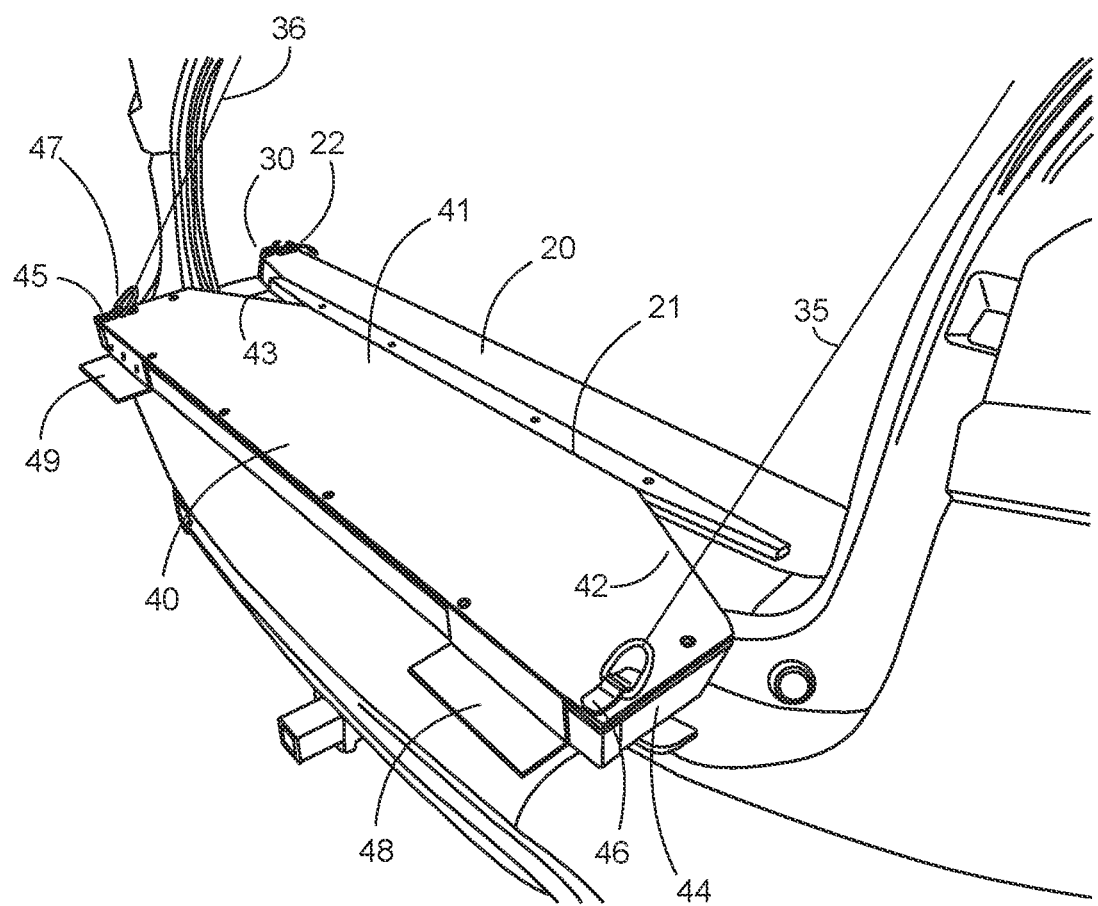
FIG. 2 is a diagram showing a left side deployment of the inside rail and the rail adapter, with a right side deployment being symmetrical.

As seen in FIG. 2, the inside rail 20 is formed as an elongated board with a protruding rear portion. The inside rail 20 extends beyond the hatch opening 73 and is longer than the hatch opening 73. The inside rail abutment face 21 is formed on the protruding rear portion. The inside rail 20 connects to the cargo loop anchor 30 at the latch hook 22.

A rail adapter 40 has a rail adapter abutment face 41 configured to about the inside rail abutment face 21. The rail adapter 40 has an adapter right bevel 42, an adapter left bevel 43 and an adapter right face 44 on a right side with an opposing adapter left face 45 on the left side. The adapter right face 44 is adjacent to an adapter right anchor 46 formed as a swivel eyelet, and the adapter left face 45 is adjacent to an adapter left anchor 47 formed as a swivel eyelet. The adapter right support 48 and the adapter left support 49 are mounted as brackets on the rear portion of the rail adapter 40. The brackets can be extruded aluminum L brackets. The right adapter anchor 46 is mounted near the adapter right support and the left adapter anchor 47 is mounted near the adapter left support. The adapter anchors can receive a cable and the cable can attach to the inside rail 20 or to the cargo loop anchor 30 at the latch hook 22, or to an external portion of the vehicle frame near the hatch opening 73 such as to the gas strut mounts of the rear hatch. A right cable 35 and the left cable 36 can attach respectively to the right adapter anchor 46 and the left adapter anchor 47.

Figure 3:
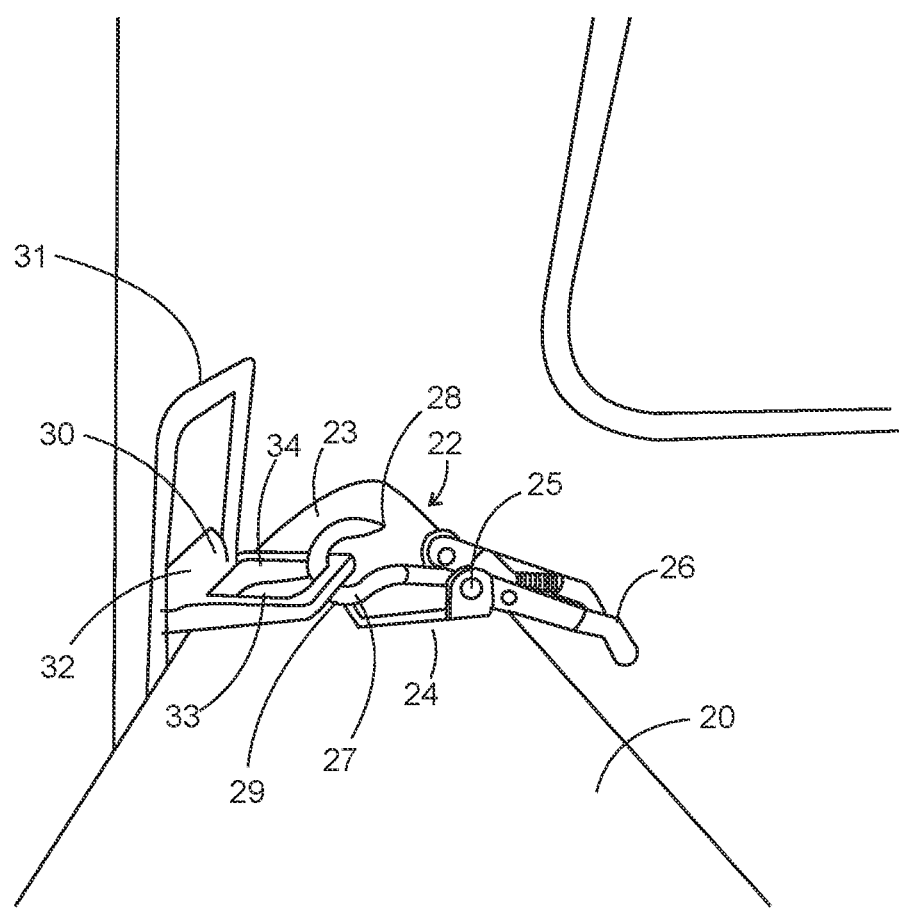
FIG. 3 is a diagram showing attachment of the inside rail to the vehicle.

As seen in FIG. 3, the inside rail 20 has a latch hook 22 on the left side. The inside rail 20 can also have a latch hook on the right side. The right side is symmetrical to the left side and looks the same. For purposes of illustration, the inside rail 20 has a left rail tip 23. The latch hook mount 24 is secured to the inside rail 20 at the left rail tip 23. The latch hook mount 24 provides a base for a latch hook 22. The latch hook 22 has a latch handle hinge 25 for pivotally mounting a latch handle 26. The latch handle 26 connects to a hook arm 27 having a hook tip 28 and a hook 29.

The cargo loop anchor 30 has a cargo loop 34 pivoting from the vehicle internal sidewall near the hatch opening. The cargo loop anchor 30 is secured to the vehicle internal sidewall at the cargo loop mount 31. A cargo loop hinge 32 is mounted to the cargo loop mount 31. The cargo loop opening 33 of the cargo loop 34 connects to the hook 29 mounted on the hook arm 27. When the latch handle 26 is engaged, the inside rail 20 biases against the vehicle internal sidewall and secures the inside rail 20 to the vehicle frame.

Figure 4:
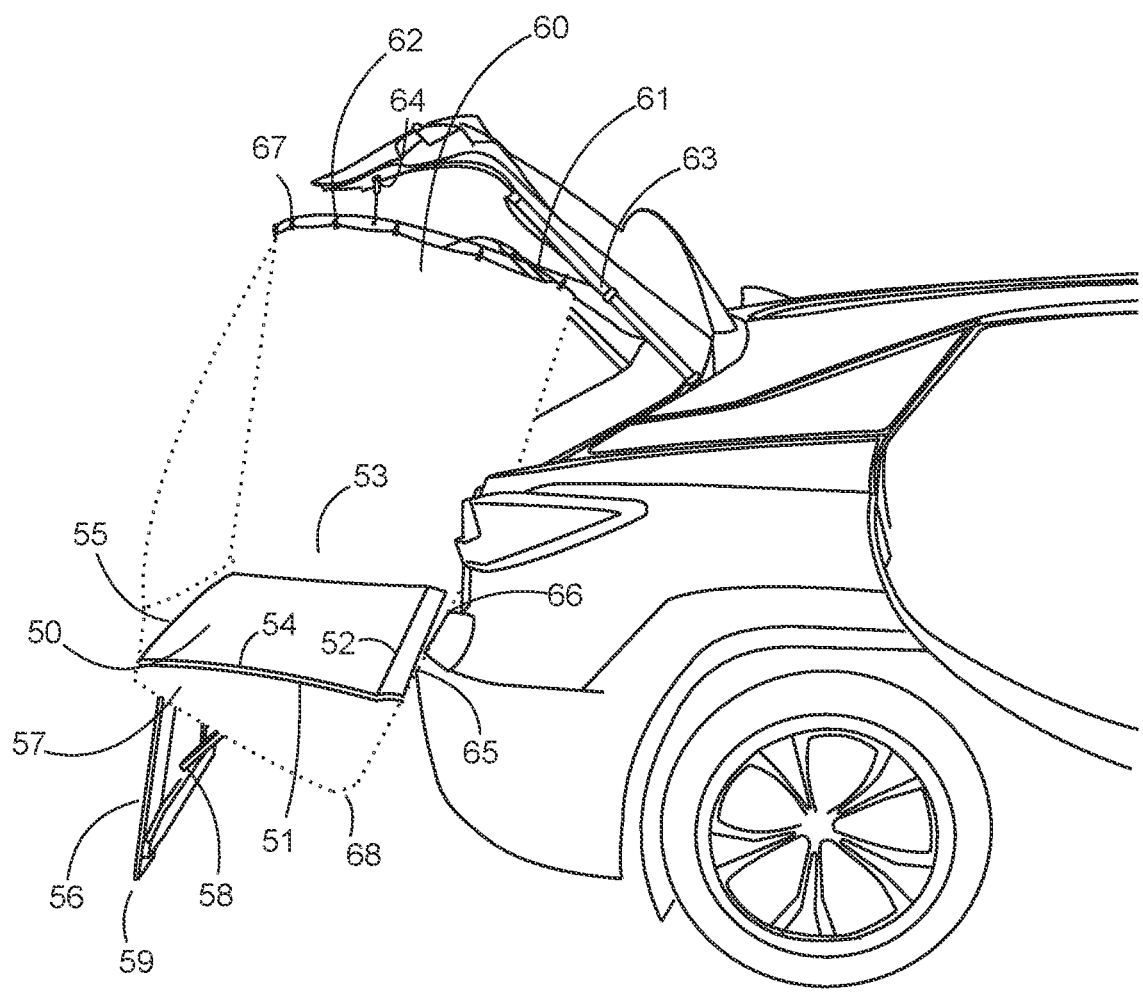
FIG. 4 is a diagram showing attachment of the table to the rail adapter.

As seen in FIG. 4, the front edge of the table 50 is secured to the vehicle at the adapter right support 48 and the adapter left support 49. The table 50 has a table top 51 with a table front edge 52, table left edge 53, table right edge 54 and a table rear edge 55. The table folding leg 56 folds on a table folding hinge 57 and is locked in an open position after being opened from a closed position. The table folding hinge 57 is locked using the folding leg support 58. The folding leg footing 59 may be height adjustable for secure placement on the ground.

After securing the table to the rail adapter 40, a user can install the curtain 60. The curtain 60 has a curtain rod 61 secured at curtain clips 62. A magnet attachment 63 secures the curtain rod 61 to a front portion of the hatchback and the rear hatch magnet 64 also secures the curtain rod 61 to the rear portion of the hatchback. The curtain inside edge 65 extends along a side of the vehicle and can be secured to the vehicle at a curtain inside edge magnet 66. The curtain 60 preferably has a curtain weighted lower tip 68 to make the curtain more secure. The curtain 60 has a curtain rod bend 67 conforming to the general profile of the hatchback.

The invention claimed is:
1. A rear hatch camper comprising:
   a. an inside rail, wherein the inside rail has an inside rail abutment face, wherein the inside rail has a latch hook configured to connect to a cargo loop anchor on a vehicle, wherein the inside rail is configured to mount inside the vehicle, wherein the inside rail has an inside rail abutment face;
   b. a rail adapter, wherein the rail adapter is elongated and flat, wherein the rail adapter has a rail adapter abutment face that abuts the inside rail abutment face of the inside rail, wherein the rail adapter is secured to the inside rail; and
   c. a table, wherein the table has a table front edge that engages the rail adapter at an adapter support, wherein the table has a table folding leg mounted on a table folding hinge, wherein the table folding hinge is mounted to the table.

2. The rear hatch camper of claim 1, wherein the vehicle has a hatch opening, wherein the hatch opening has a threshold, wherein the threshold has a threshold front face, wherein the inside rail abutment face abuts the threshold at the threshold front face.

3. The rear hatch camper of claim 1, further comprising a curtain mounted on a curtain rod, wherein the curtain rod is configured to be bendable at a curtain rod bend, wherein a rear hatch magnet secures the curtain rod.

4. The rear hatch camper of claim 1, wherein the inside rail is longer than a hatch opening.

5. The rear hatch camper of claim 1, wherein the rail adapter has an adapter right bevel and an adapter left bevel.

6. The rear hatch camper of claim 1, wherein the adapter support is formed as an adapter right support, and an adapter left support.

7. The rear hatch camper of claim 1, further including an adapter right anchor and an adapter left anchor, wherein the adapter right anchor connects to a right cable, and wherein the adapter left anchor connects to a left cable.

8. The rear hatch camper of claim 1, further including a curtain, wherein the curtain has a curtain rod secured at curtain clips, and further including an attachment magnet, wherein the attachment magnet secures the curtain rod.

9. The rear hatch camper of claim 1, wherein the vehicle has a hatch opening, wherein the hatch opening has a threshold, wherein the threshold has a threshold front face, wherein the inside rail abutment face abuts the threshold at the threshold front face, wherein the inside rail is longer than the hatch opening.

10. The rear hatch camper of claim 9, further comprising a curtain mounted on a curtain rod, wherein the curtain rod is configured to be bendable at a curtain rod bend, wherein the rear hatch magnet secures the curtain rod.

11. The rear hatch camper of claim 9, wherein the rail adapter has an adapter right bevel and an adapter left bevel, wherein the adapter support is formed as an adapter right support, and an adapter left support.

12. The rear hatch camper of claim 9, further including an adapter right anchor and an adapter left anchor, wherein the adapter right anchor connects to a right cable, and wherein the adapter left anchor connects to a left cable.

13. The rear hatch camper of claim 9, further including a curtain, wherein the curtain has a curtain rod secured at curtain clips, and further including an attachment magnet, wherein the attachment magnet secures the curtain rod.

* * * * *